Patented Apr. 19, 1932

1,854,847

UNITED STATES PATENT OFFICE

RICHARD KUHN, OF HEIDELBERG, GERMANY

PROCESS FOR CATALYTICALLY OXIDIZING HYDROGEN SULPHIDE

No Drawing. Application filed December 19, 1929, Serial No. 415,363, and in Switzerland December 22, 1928.

In general, stable complex salts are characterized by the fact that the elements contained in the complex do not exhibit the reactions of their free ions. In consequence it is not to be supposed that such compounds would have a catalytic action and indeed salts, such as potassium nickel cyanide, are very little active.

By the present invention, however, hydrogen sulphide and salts thereof are oxidized catalytically by means of molecular oxygen in the presence of complex compounds which derive, on the one part, from heavy metals, and, on the other part, from cyclic organic compounds, whereby the reaction is greatly accelerated.

The invention finds particular application in the removal of sulphur from illuminating gas, coke-oven gas or other industrial gases containing sulphur compounds, so that this sulphur becomes marketable, either in an elementary form or in some converted form.

The following examples illustrate the invention, the parts being by weight:—

Example 1

0.002 parts of copper in the form of complex salts from copper and 1-hydroxyanthraquinone, obtained by mixing an alcoholic solution of 1-hydroxyanthraquinone with ammoniacal copper hydroxide, are dissolved in pyridine, this red solution being then added to 100 parts of a solution of sodium hydrosulphide containing 1.51 per cent. of NaHS. A current of oxygen is now passed through the solution until its quick absorption has ceased. In this manner the hydrosulphide is oxidized to thiosulphate almost quantitatively, which is separated according to known methods.

Example 2

A current of coal-gas freed from tar is passed through 100 parts of a dilute solution of soda until the sulphur content of the solution has reached 1.53 per cent., whereupon the gas current is interrupted. On the other hand, 0.009 parts of manganese acetate are dissolved in some alcohol, adding thereto an alcoholic solution of 0.02 parts of alizarine, whereby instantaneous formation of complex salt occurs. These two solutions are mixed and a current of oxygen is quickly led through the liquid until the absorption of oxygen slackens. The speed of the oxygen absorption is increased manifold as compared with the blank trial with the corresponding quantity of alcoholic manganese acetate. Besides some few per cents of sulphur chiefly sodium thiosulphate has been formed. In like manner another salt of the hydrogen sulphide, such as ammonium sulphhydrate, calcium sulphhydrate, etc., may be oxidized.

Example 3

A current of generator gas is passed through 100 parts of a solution of soda of 3.85 per cent. strength until the latter can absorb no more sulphuretted hydrogen. On the other part, 0.02 parts of quinizarin are dissolved in alcohol containing 16 per cent by volume of pyridine. To this latter solution an alcoholic solution of 0.0086 parts of copper acetate is added, whereby instantaneous formation of the complex salt occurs. This complex compound is added to a solution containing sulphur, and a current of air is then passed through this liquid until oxidation is complete. The solution remains almost clear and sodium thiosulphate may be separated therefrom in good yield.

With similar success also 1:2:8-trihydroxyanthraquinone and other anthraquinone derivatives which are suitable for the formation of complex metal salts may be used in the place of quinizarin.

For carrying out the process also other metals may be used.

Example 4

Coal-gas which has been freed from tar is passed through a dilute solution of sodium carbonate until a sodium sulphide solution containing 3.77 per cent. of sulphur has been produced. The gas current is then interrupted and to the solution is added hæmin, which has suitably been dissolved in disodium phosphate or, even better, in pyridine, in amount corresponding with a proportion of 0.01 gram of iron. A rapid current of air is now passed through the solution until the absorption of oxygen has nearly ceased. The speed of oxygen absorption is found in this case to be 6.5 times that experienced when no hæmin is present. The solution remains clear, the sodium sulphide having been oxidized to sodium thiosulphate in a smooth reaction.

In like manner a calcium salt of hydrosulphuric acid, such as calcium sulphhydrate, may be oxidized.

What I claim is:—

1. A process for catalytically oxidizing hydrogen sulphide comprising treating a solution or a salt thereof with oxygen or a gas containing oxygen in presence of a metal complex compound comprised on the one hand, of heavy metals, and on the other hand, of cyclic organic compounds.

2. A process for catalytically oxidizing hydrogen sulphide, comprising treating a solution or salt thereof with oxygen or a gas containing oxygen, in the presence of hæmin.

In witness whereof I have hereunto signed my name this 6th day of December, 1929.

RICHARD KUHN.